(12) United States Patent
Cullen et al.

(10) Patent No.: US 10,036,118 B2
(45) Date of Patent: Jul. 31, 2018

(54) WIRE ELEMENT ARRANGEMENT IN AN ENERGY RECOVERY DEVICE

(71) Applicant: EXERGYN LIMITED, Dublin (IE)

(72) Inventors: Barry Cullen, Dublin (IE); Kevin O'Toole, Dublin (IE); Georgiana Tirca-Dragomirescu, Dublin (IE); Keith Warren, Dublin (IE); Ronan Byrne, Dublin (IE); Rory Beirne, Dublin (IE)

(73) Assignee: EXERGYN LIMITED, Dublin (IE)

( * ) Notice: Subject to any disclaimer, the term of this patent is extended or adjusted under 35 U.S.C. 154(b) by 0 days.

(21) Appl. No.: 15/535,153

(22) PCT Filed: Dec. 14, 2015

(86) PCT No.: PCT/EP2015/079660
§ 371 (c)(1),
(2) Date: Jun. 12, 2017

(87) PCT Pub. No.: WO2016/092118
PCT Pub. Date: Jun. 16, 2016

(65) Prior Publication Data
US 2017/0362772 A1   Dec. 21, 2017

(30) Foreign Application Priority Data
Dec. 12, 2014   (GB) .................................. 1422153.5

(51) Int. Cl.
*F03G 7/06*   (2006.01)
*D07B 1/06*   (2006.01)
*E01D 19/16*   (2006.01)

(52) U.S. Cl.
CPC ............ *D07B 1/0673* (2013.01); *E01D 19/16* (2013.01); *F03G 7/065* (2013.01); *D07B 2201/2009* (2013.01); *D07B 2205/3085* (2013.01)

(58) Field of Classification Search
CPC ................................ F03G 7/065; E01D 19/16
See application file for complete search history.

(56) References Cited

U.S. PATENT DOCUMENTS

| 4,306,415 A | 12/1981 | Hochstein et al. |
| 2005/0150223 A1* | 7/2005 | Rey .......................... F03G 7/065 60/527 |
| 2009/0226691 A1 | 9/2009 | Mankame |
| 2012/0324858 A1 | 12/2012 | Browne et al. |

FOREIGN PATENT DOCUMENTS

| EP | 1130257 | 9/2001 |
| GB | 2497542 | 6/2013 |

* cited by examiner

*Primary Examiner* — Jonathan Matthias
(74) *Attorney, Agent, or Firm* — Occhiuti & Rohlicek LLP

(57) ABSTRACT

A plurality of wire elements for use in an energy recovery device comprising Shape Memory Alloy or other Negative Thermal Expansion (NTE) material, wherein at least one wire element is fixed at one end and free to move at a second end, such that the wire elements are arranged adjacently and are in friction or interference contact with each other and are secured at the outer perimeter of wires utilising a securing means. In such arrangement, during the operation of the bundle arrangement in a heat engine system, the plate elements act to transmit the aggregated force generation of the wire grouping and thus usefully recover and transmit power.

20 Claims, 14 Drawing Sheets

(a)   (b)   (c)

Inflatable Ring Bundle Holder with Nitinol Wire

Fig. 20. Types of threads for the SMA wire: a) straight helical thread; b) tapered helical thread

WIRE ELEMENT ARRANGEMENT IN AN ENERGY RECOVERY DEVICE

CROSS REFERENCE TO RELATED APPLICATIONS

This application is a National Phase under 35 USC 371 of International Application No. PCT/EP2015/079660 filed on Dec. 14, 2015, which claims priority to United Kingdom Application No. 1422153.5 filed Dec. 12, 2014, the contents of which are hereby incorporated herein by reference in their entirety.

FIELD

The present application relates to the field of energy recovery and in particular to the use of Shape-Memory Alloys (SMA) or Negative Thermal Expansion (NTE) materials for the same.

BACKGROUND

Low-grade heat, which is typically considered less than 100 degrees, represents a significant waste energy stream in industrial processes, power generation and transport applications. Recovery and re-use of such waste streams is desirable. An example of a technology which has been proposed for this purpose is a Thermoelectric Generator (TEG). Unfortunately, TEGs are relatively expensive. Another largely experimental approach that has been proposed to recover such energy is the use of Shape Memory Alloys.

A Shape Memory Alloy (SMA) is an alloy that "remembers" its original, cold-forged shape which once deformed returns to its pre-deformed shape upon heating. This material is a lightweight, solid-state alternative to conventional actuators such as hydraulic, pneumatic, and motor-based systems.

The three main types of shape-memory alloys are the copper-zinc-aluminium-nickel, copper-aluminium-nickel, and nickel-titanium (NiTi) alloys but SMAs can also be created, for example, by alloying zinc, copper, gold and iron or using other suitable elements.

The memory of such materials has been employed or proposed since the early 1970s for use in heat recovery processes and in particular by constructing SMA engines which recover energy from heat as motion. Recent publications relating to energy recovery devices include PCT Patent Publication number WO2013/087490, assigned to the assignee of the present invention. Other patent publications in the art include U.S. Pat. No. 4,306,415 (Hochstein) and US2005/150223 (United Technologies). It is desirable to translate the contraction of the SMA or NTE material into a mechanical force in an efficient manner. It is also desirable to position and design the SMA or NTE material in an efficient way. It is not a trivial task and generally is complicated and involves significant energy losses.

It is therefore an object to provide an improved system and method in an energy recovery device.

SUMMARY

According to the invention there is provided, as set out in the appended claims, an energy recovery device comprising:
a drive mechanism;
an engine comprising a plurality of Shape Memory Alloy (SMA) elements or Negative Thermal Expansion (NTE) elements fixed at a first end and connected at a second end to the drive mechanism characterised by the NTE elements and arranged in a bundle friction fit configuration to ensure the NTE elements are tightly packed together.

In one embodiment there is provided a bracket adapted to clamp the SMA or NTE elements together in a bundle friction fit configuration.

In one embodiment at least one SMA or NTE element is swaged at one end to create a mechanical barrier to prevent slippage of the element in use.

In one embodiment the energy recovery device comprises a friction fit device.

In one embodiment the device comprises a chuck adapted to secure the SMA or NTE elements in a friction fit configuration.

In one embodiment the chuck comprises a clamp and an adjuster configured to adjust the force applied to the SMA or NTE elements.

In one embodiment the energy recovery device comprises a friction fit device wherein the device comprises a chain adapted to be tensioned around the SMA or NTE elements using a shackle.

In one embodiment there is provided a friction fit device wherein the device comprises a spring clip to ensure the SMA or NTE elements are tightly packed together.

In one embodiment the spring clip comprises a stiff material wrapped in a circular fashion and fitted back through a slot.

In one embodiment there is provided a friction fit device wherein the device comprises a clamp adapted to secure the SMA or NTE elements in a friction fit configuration wherein the clamp is biased by at least one spring to force the clamp around the SMA or NTE elements.

In one embodiment there is provided a friction fit device wherein the device comprises a cable gland to secure the SMA or NTE elements in a friction fit configuration.

In one embodiment there is provided a friction fit device wherein the device comprises a pressurised elastic tubular ring to secure the NTE elements in a friction fit configuration.

In one embodiment the elastic tubular ring is inflatable.

In one embodiment there is provided a friction fit device wherein the device comprises a compression ring configured to retain the SMA or NTE elements in position.

In one embodiment the device comprises at least one groove support. The groove support serves the function of increasing the surface area to enhance the frictional bond between the bundle holder and the wire elements immediately adjacent to the holder. The grooves can also serve to guide the wires and ensure that interference between adjacent wires is minimised.

In one embodiment at least one SMA or NTE element comprises a threaded wire.

In one embodiment the threaded wire comprises a straight helical thread or a tapered helical thread.

In another embodiment there is provided a plurality of wire elements for use in an energy recovery device comprising Shape Memory Alloy or other Negative Thermal Expansion (NTE) Material, wherein at least one wire element is fixed at one end and free to move at a second end, such that the wire elements are arranged adjacently and are in friction or interference contact with each other and are secured at the outer perimeter of wires utilising a securing means.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The invention relates to a heat recovery system under development which can use either Shape-Memory Alloys (SMA) or Negative Thermal Expansion materials (NTE) to generate power from low grade heat.

Figure 1:
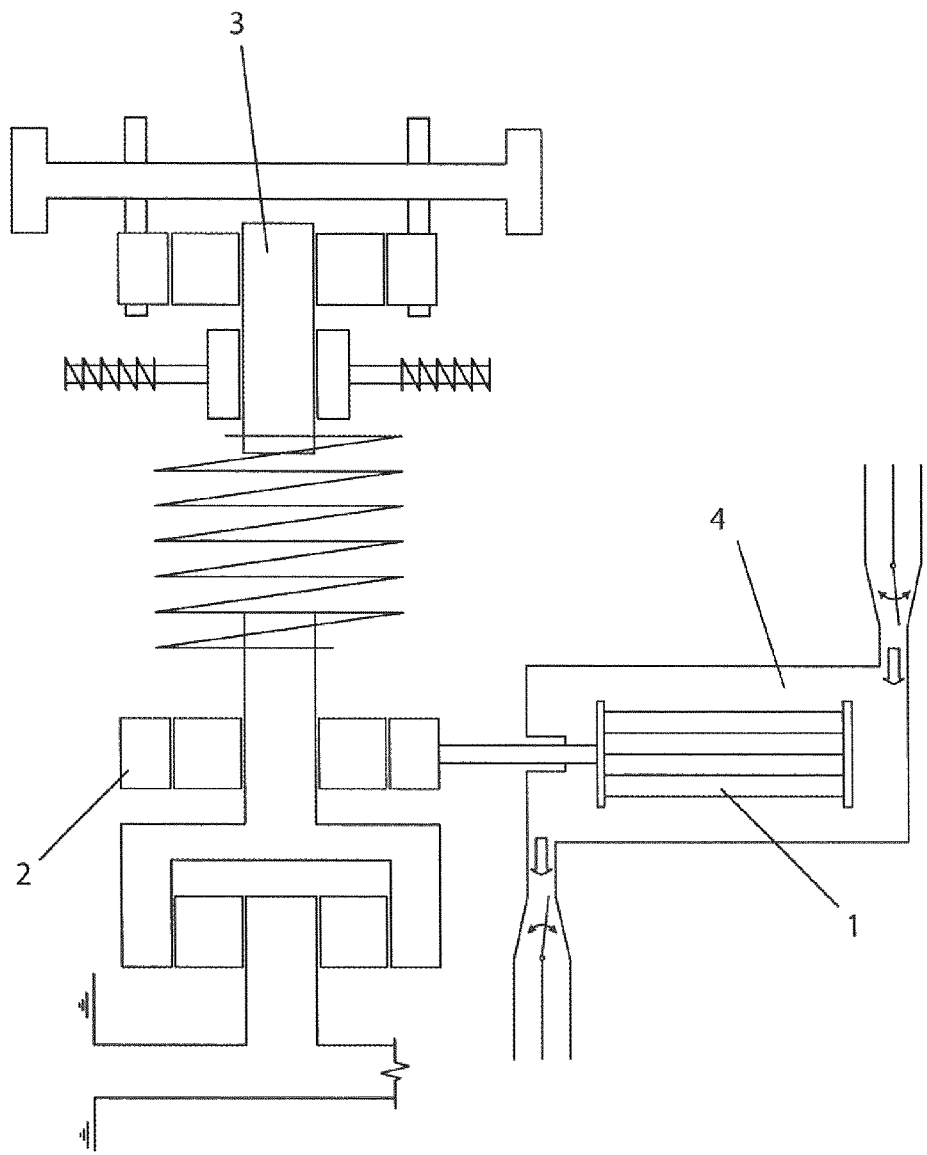
FIG. 1 illustrates an exemplary energy recovery device using SMA or NTE materials.

An exemplary known embodiment of an energy recovery device will now be described with reference to FIG. 1 which provides an energy recovery device employing a SMA engine indicated by reference numeral 1. The SMA engine 1 comprises an SMA actuation core. The SMA actuation core is comprised of SMA material clamped or otherwise secured at a first point which is fixed. At the opposing end, the SMA material is clamped or otherwise secured to a drive mechanism 2. Thus whilst the first point is anchored the second point is free to move albeit pulling the drive mechanism 3. An immersion chamber 4 adapted for housing the SMA engine and is adapted to be sequentially filled with fluid to allow heating and/or cooling of the SMA engine. Accordingly, as heat is applied to the SMA core it is free to contract. Suitably, the SMA core comprises a plurality of parallel wires, ribbons or sheets of SMA material. Typically, a deflection in and around 4% is common for such a core. Accordingly, when a 1 m length of SMA material is employed, one might expect a linear movement of approximately 4 cm to be available. Higher movements can also be obtained. It will be appreciated that the force that is provided depends on the mass of wire used. Such an energy recovery device is described in PCT Patent Publication number WO2013/087490, assigned to the assignee of the present invention, and is incorporated fully herein by reference.

For such an application, the contraction of such material on exposure to a heat source is captured and converted to usable mechanical work. A useful material for the working element of such an engine has been proven to be Nickel-Titanium alloy (NiTi). This alloy is a well-known Shape-Memory Alloy and has numerous uses across different industries.

Force is generated through the contraction and expansion of this alloy (presented as a plurality of wires) within the working core, via a piston and transmission mechanism. The most important aspect of this system is the ability to secure the NiTi elements at both ends such that a reliable assembly is created, enabling high-force, low displacement work to be performed for a maximum number of working cycles. Accordingly, depending on the requirements of a particular configuration and the mass of SMA material needed a plurality of wires may be employed together in a single core.

The wire's extremities have to be presented in such a way that they are able to be securely fixed in a metallic support, hereinafter referred to as a bundle holder.

Thus far, a useful material for such a working mass has been found to be Nickel-Titanium alloy (NiTi). This alloy is a well-known Shape Memory Alloy and has numerous uses across different industries.

The NiTi wires form the working element of the engine. Force is generated through the contraction and expansion of these elements within the working core, via a piston and a mechanical/hydraulic transmission system. In one embodiment a piston and crank mechanism could be used. An important aspect of this system is the ability to secure the NiTi elements at both ends such that a strong and reliable union is created, enabling high-force, low displacement work to be performed for a maximum number of working cycles.

In order to secure the NiTi wires in the engine, it is required to develop a system that can anchor each wire at both ends, in such a fashion as will allow it to operate under high load. This system has been designated as the "bundle holder". The bundle holder must overcome two specific problems:

1) Transmit the high-force, low displacement load of the NiTi wires during operation. This is a single degree of freedom (DOF) system whereby one end of the bundle is secured and remains stationary, whilst the opposing end is free to move in one axis of displacement to enable the movement of the piston and the harnessing of the work.

2) Enable the close-packing of the wires, insofar as possible, to enable maximum heat transfer from the transiting water to the wire and vice versa.

First Embodiment

Figure 2:
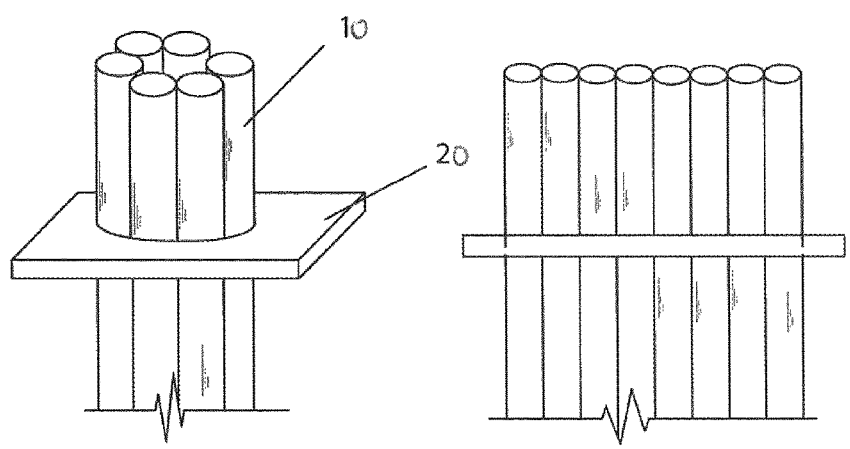
FIG. 2 illustrates a first embodiment of the present invention showing how SMA or NTE wires can be secured using a friction fitting.

In one solution FIG. 2 illustrates a friction fit method to ensure the close packing of the working wires, according to a first aspect of the invention. The wires 10 are grouped together and clamped using a bracket mechanism 20. The bracket may be constructed from metal or otherwise and is compressed around the wire bundle in such a way as to allow any force exerted on or by the wires to be transmitted through the bracket by way of a frictional or interference fit. In essence, this bracket keeps the wires closely packed whilst also enabling the transmission of force through the friction fit of the bracket and the wires. Close-packing of the wires in this manner provides advantages for minimizing the total size of the system and for ensuring compact realisation of the energy recovery device.

The embodiment enables the fixing of the SMA or NiTi wires in such a way that the high force developed by their contraction can be safely transmitted such that mechanical work can be produced.

Second Embodiment

As is generally understood, a Shape-Memory Alloy (SMA) or Negative Thermal Expansion (NTE) material will contract not only longitudinally (along a central axis) but also laterally (in the diametrical plane). It is foreseeable, therefore, that any bundle of working elements comprised of such material would likely encounter shrinkage in the lateral direction. This shrinkage can have negative implications for the integrity of a friction-based fixing system, as the loss of the cross sectional area of the bundle, however small, would enable a relaxation of the frictional bond, thus enabling slippage or total loss of adhesion.

Figure 3:
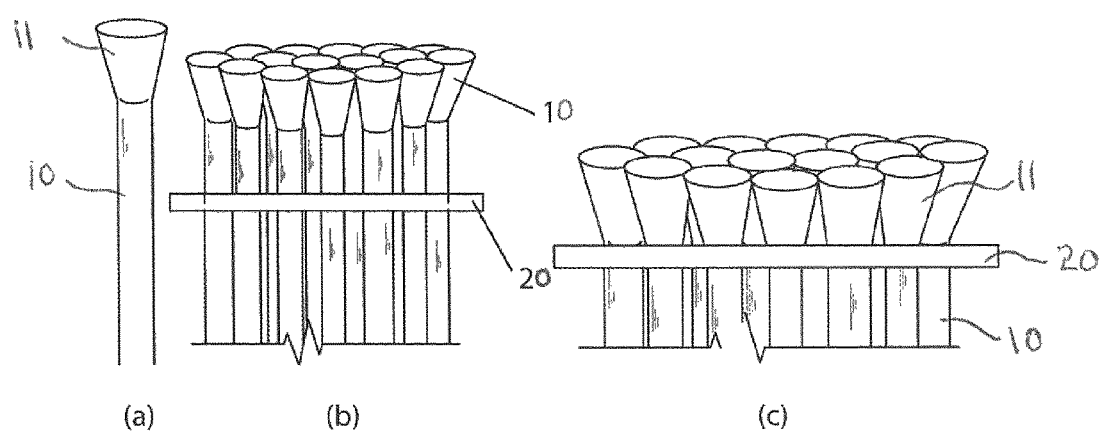
FIG. 3 illustrates a first embodiment of the present invention showing how SMA or NTE wires can be secured with a swaged fitting.

One embodiment that avoids this is illustrated in FIG. 3. Swages or flares are added to the terminal ends of the wires 10. A simple swage system 11 creates a mechanical barrier to the slippage of the wire element through a designated guide hole in the bundle holder. In such a set-up, each wire has its own individual guide hole, giving rise to a "salt shaker" type bundle holder system whereby a solid plate of material is pierced many times (however many wires are required in the given engine) to enable a given number of wires to be utilised in the engine. In this arrangement, the swage provides a mechanical barrier itself, with the force of the contraction transmitted directly through the interface of the swage and the bundle holder.

By swaging or flaring the ends of the NiTi wire 11, and by grouping them according to the principle laid out in the previous concept, a cumulative flared effect may be obtained at the terminal end of the wires. Once the flared terminals are secured in place (FIG. 3c), the flaring of individual wires in this way prevents the slippage that may occur by the lateral shrinkage of the material by presenting an obstacle to the transit of adjacent wires through the holder itself. In essence, an aggregate flare is created, which resists the slippage of any individual wire and in so doing, preserves the integrity of the bundle as a whole.

This embodiment enables the NiTi wires to be fixed in such a way that the high force developed by their contraction can be safely transmitted such that mechanical work can be produced.

Third Embodiment

A useful material for the working element of such an engine has been proven to be Nickel-Titanium alloy (NiTi). This alloy is a well-known Shape Memory Alloy and has numerous uses across different industries.

As described above force is generated through the contraction and expansion of this alloy (presented as a plurality of wires) within the working core, via a piston and transmission mechanism. The most important aspect of this system is the ability to secure the NiTi elements at both ends such that a reliable assembly is created, enabling high-force, low displacement work to be performed for a maximum number of working cycles.

In order for a Nitinol core to actuate a piston a method must be identified for fixing a bundle of wires so that one end is fixed to the top of the core and the other end is attached to the piston.

A friction fit is one possible way of securing wires together. Basically a friction fit is where the roughness of two surfaces is used to prevent slippage or movement of an object. The effectiveness of the fit is determined by the coefficient of friction for each surface, the area of contact and the pressure between the surfaces.

Figure 4:
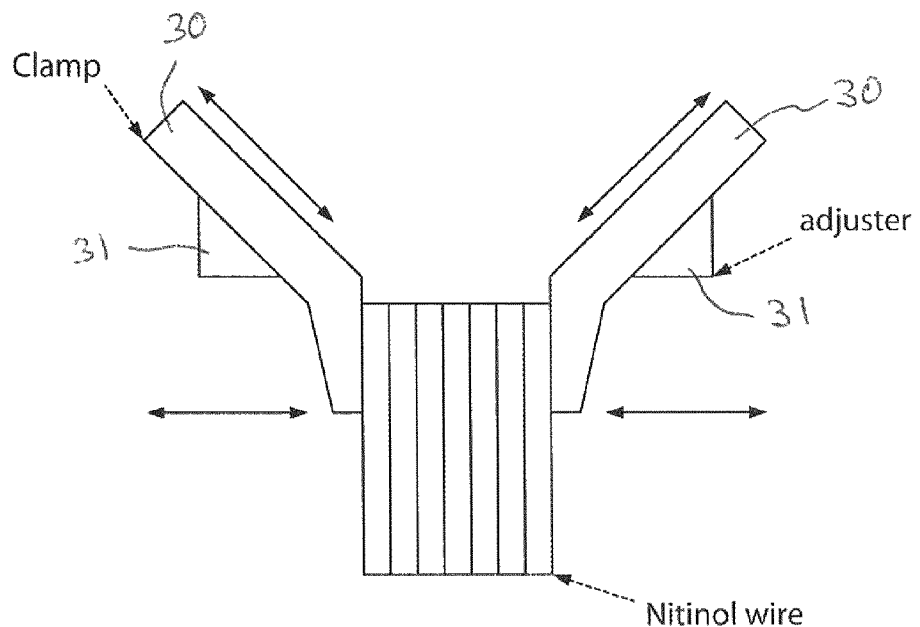
FIG. 4 illustrates a method of securing a bundle of wires by means of friction fitting, for example using a chuck.

FIG. 4 shows a method of securing a bundle of wires by means of friction fitting. The friction fit is created by a device which works in a similar manner to a pillar drill chuck. However a standard chuck is designed only to holder one piece of material.

As can be seen in FIG. 4 the chuck comprises two components: a clamp 30 and an adjuster 31. The adjuster is made of one single circular piece while the clamp can consist of several units in order to increase surface contact with the is wire bundle. The adjuster is connected to the clamp by an angled threaded section. When the adjuster is rotated in a clockwise manner it causes the angled section of the clamp to move down. The clamp also has a vertically flat section which is parallel with the bundle of wire. As the angled section moves down it causes the flat section to move horizontally which applies a force on the outer surface of the bundle. The result is that the individual wires are pushed together increasing the friction between them and with enough applied force, preventing individual wires from being pulled from the bundle.

The main advantage of this embodiment is that the chuck allows for the force applied on the bundle to be manually adjusted by means of a tool such as a chuck key.

The chuck can be made of materials which have high corrosion resistance in water such as stainless steel or aluminium. Greasing the threads on the clamp and adjuster can also combat against the unit seizing up.

The motivation behind the creation of this embodiment was to be able to fix the wires in such a way that the high force developed by their contraction can be safely transmitted such that mechanical work can be produced.

Fourth Embodiment

As mentioned previously, a useful material for the working element of such an engine has been proven to be Nickel-Titanium alloy (NiTi). This alloy is a well-known Shape Memory Alloy and has numerous uses across different industries.

Force is generated through the contraction and expansion of this alloy (presented as a plurality of wires) within the working core, via a piston and transmission mechanism. The most important aspect of this system is the ability to secure the NiTi elements at both ends such that a reliable assembly is created, enabling high-force, low displacement work to be performed for a maximum number of working cycles.

In order for a Nitinol core to actuate a piston a method must be identified for fixing a bundle of wires so that one end is fixed to the top of the core and the other end is attached to the piston.

A friction fit is one possible way of securing wires together. Basically a friction fit is where the roughness of two surfaces is used to prevent slippage or movement of an object. The effectiveness of the fit is determined by the coefficient of friction for each surface, the area of contact and the pressure between the surfaces.

Figure 5:
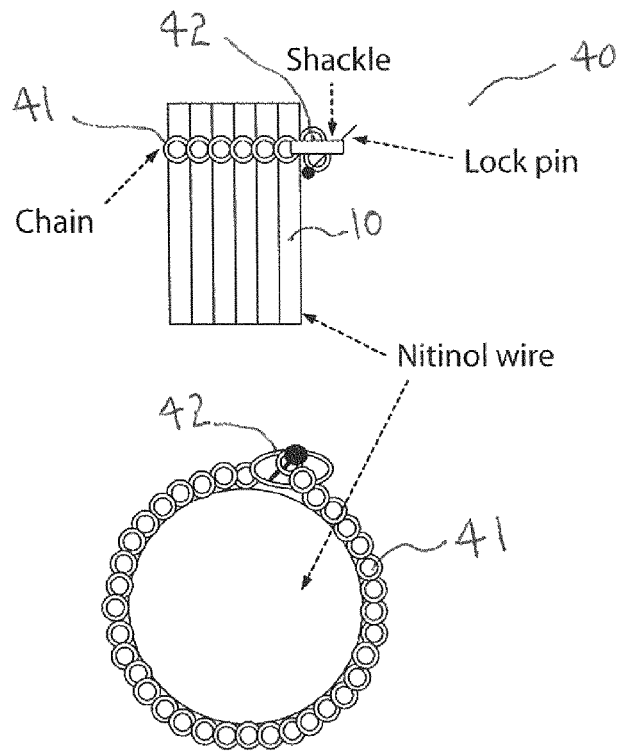
FIG. 5 illustrates an embodiment for creating a friction fit between a bundle of wires with the purpose of preventing any wire from being removed during service due to a vertical force.

FIG. 5 show a concept 40 for creating a friction fit between a bundle of wires with the purpose of preventing any wire from being removed during service due to a vertical force. As can be seen a chain 41 is provided which is made from a steel or other material. Connected to the chain is a shackle 42 of a size allowing the chain to be fully passed through.

This embodiment allows a friction fit to be created by wrapping the chain around the bundle and then passing it through a shackle. The chain passed through the shackle is tensioned so as to force the wires together and therefore increase the friction between them. When the chain is fully tensioned a locking pin is placed through the bore of the chain which is closest to the shackle. This prevents the chain from pulling through the shackle therefore maintaining the tension in the chain.

This embodiment reduces the steps required in manufacturing a bundle as the wire simply has to be cut. Also this method allows for the bundle of wires to be opened quickly by removing the pin which would reduce the time required to remove or insert wires during service.

The motivation behind the creation of this concept was to be able to fix the NiTi wires in such a way that the high force developed by their contraction can be safely transmitted such that mechanical work can be produced.

Fifth Embodiment

In order for a Nitinol core to actuate a piston a method must be identified for fixing a bundle of wires so that one end is fixed to the top of the core and the other end is attached to the piston.

A friction fit is one possible way of securing wires together. Basically a friction fit is where the roughness of two surfaces is used to prevent slippage or movement of an object. The effectiveness of the fit is determined by the coefficient of friction for each surface, the area of contact and the pressure between the surfaces.

Figure 6:
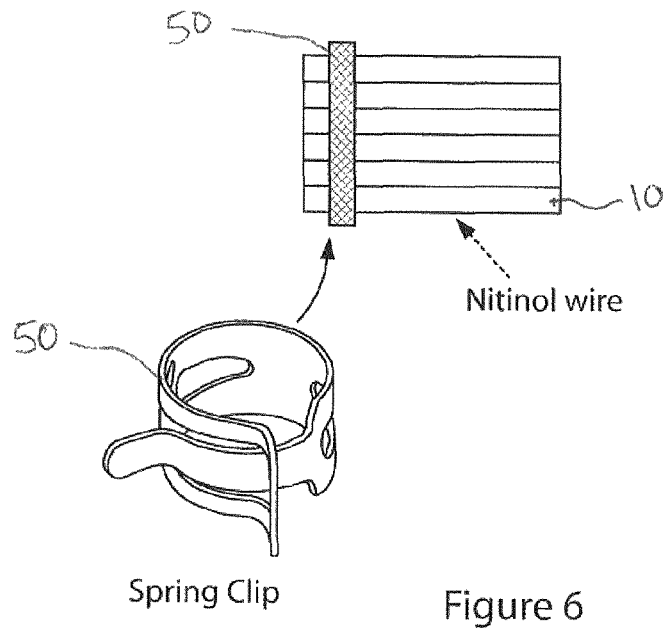
FIG. 6 illustrates a method of creating a friction fit for the purpose of holding two or more solid/hollow wires together.

FIG. 6 illustrates a method of creating a friction fit for the purpose of holding two or more solid/hollow wires together. As can be seen the use of a spring clip 50 can be adapted to grip and hold the ends of the wires together in a tight fit arrangement.

A spring clip 50 is typically a continuous piece of stiff elastic material that is wrapped in a circular fashion and fitted back through a slot. Each end consists of a vertical adjusting point. When these points are pulled together it causes the diameter of the clip to increase. In order to create a friction fit between the bundles of wires, the bundle would be packed into the clip when it has been extended to the larger diameter. When in position, the adjustment points are released which causes the diameter to decrease. The decrease in diameter causes the clip to force the wires together and therefore increase the friction between each wire. The force applied to the wire bundle is determined by the elastic stiffness of the material used in the clip. If the force is high enough this will prevent individual wires from pulling out during operation.

Also the advantage with this method is that as the wire diameter decrease when phase transformation occur, the clip will also decrease its inner radius and therefore maintain a force to holder the bundle together.

The motivation behind the creation of this embodiment was to be able to fix the wires in such a way that the high force developed by their contraction can be safely transmitted such that mechanical work can be produced.

Sixth Embodiment

In order for a core to actuate a piston a method needs to be identified for fixing a bundle of wires so that one end is fixed to the top of the core and the other end is attached to the piston.

A friction fit is one possible way of securing wires together. Basically a friction fit is where the roughness of two surfaces is used to prevent slippage or movement of an object. The effectiveness of the fit is determined by the coefficient of friction for each surface, the area of contact and the pressure between the surfaces.

Figure 7:
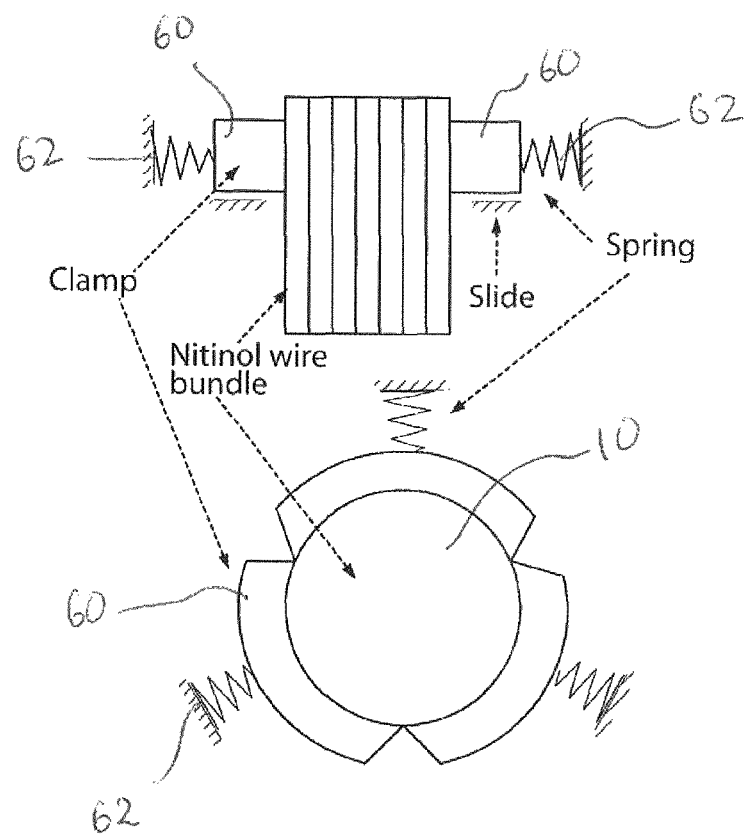
FIG. 7 illustrates a method of securing a bundle of wires by means of friction fitting, for example using a spring based chuck.

FIG. 7 shows another embodiment for creating a friction fit. This embodiment is based on the previously discussed chuck concept. This concept creates a friction fit by using at least one clamp 60 to press in against the outer surface of the wire bundle, similar to the chuck concept. However with the chuck concept the clamps are manually adjusted which creates a potential risk of the chuck becoming loose during service or accidentally being left loose during maintenance.

This embodiment avoids this problem by using springs 62 to force the clamps against the surface therefore increasing the friction between the wires. In FIG. 7 a top view is also illustrated where three clamps are used to contact the bundle. During installation, the clamps 60 are pulled back and held. The bundle is then inserted to the core. Once in position the clamps are released where they enclose the outside of the bundle. The force applied is dependent on the stiffness of the springs used.

Seventh Embodiment

This embodiment provides a solution to an issue involved in securing Shape Memory Alloy (SMA) wire in way which does not require the individual positioning of the wires during bundle assembly. Current methods employed involved the use of "salt shaker" embodiments, which consisted of a metal plate with an individual hole drilled for each wire contained in a bundle. This method entails lengthy manual assembly times which cause large lead times and costs during assembly. The embodiment discussed herein describe a method of securing bundles of wires whereby the order in which the wires are installed can be random, thereby allowing more autonomous and faster assembly of the SMA wire bundles.

This embodiment also provides a method of bundle securement which can eliminate the need for swaged or domed wires, whereby the friction forces applied on the wire is enough to secure it. This would be advantageous against the salt shaker concept as it would remove a step of SMA wire processing thereby reducing manufacturing costs.

Figure 8:
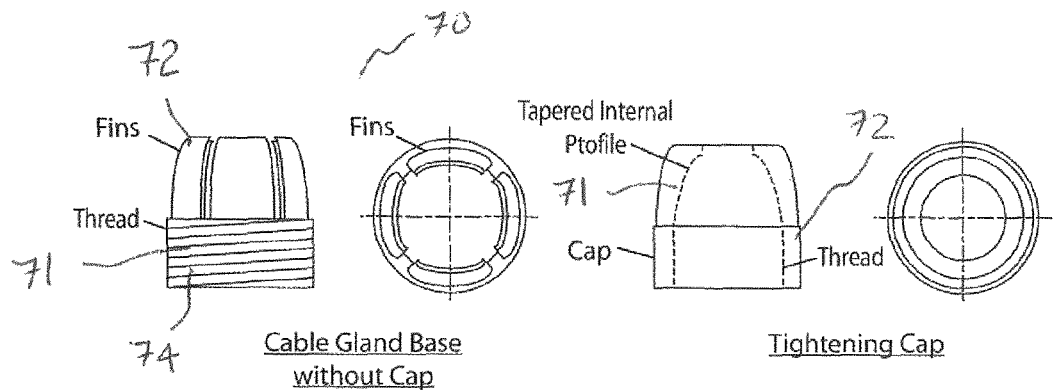
FIGS. 8, 9 & 10 illustrate use of a cable gland for securing wire bundles together according to one embodiment.

This embodiment involves the use of a cable gland 70 for securing the wire bundles together. Cable glands are typically used to secure electrical wire into a container in order to prevent external environments affecting the internal electrical components. This embodiment proposes an alternate use for this device. The cable gland component is illustrated in FIG. 8, and consists of two pieces: the base 71 and cap 72.

Figure 9:
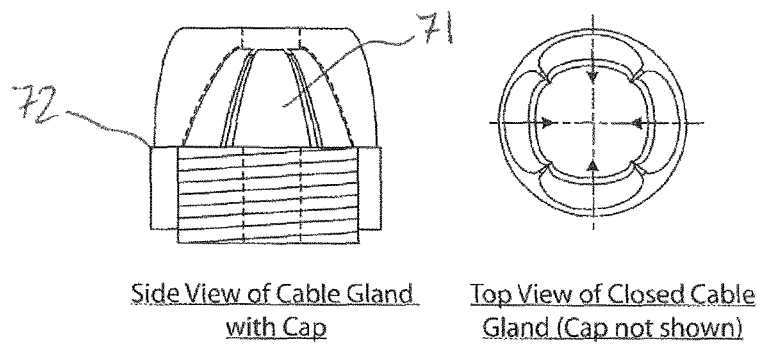

The base 71 component consists of flexible fins 73 or teeth and a threaded feature 74. The cap 72 can be seen to contain a matching female tread to the base, as well as a tapered internal geometry. When rotated onto the base, the lowering cap causes the fins to be forced radially towards each other. These closing teeth, which may have a lining to increase friction, are used to secure wire which runs through the hollow centre. This operation is illustrated in FIG. 9.

Figure 10:
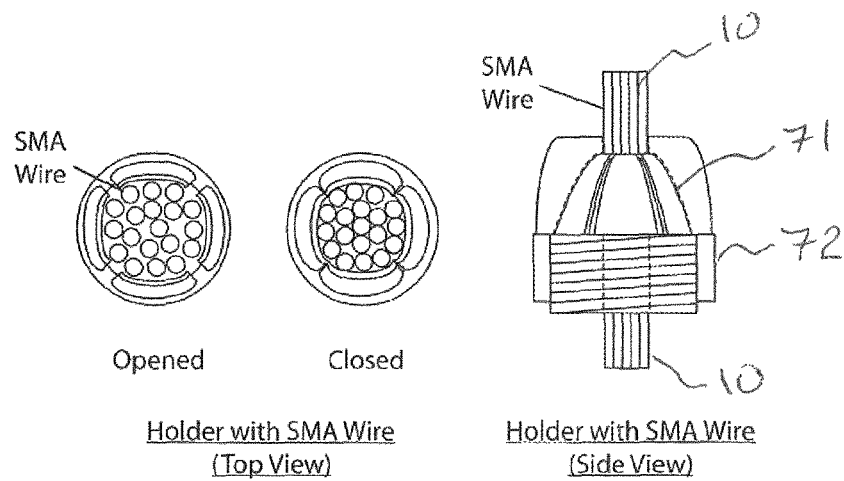

The application proposed in using this component for securing the wire bundle may require a more robust version of the device, for example one manufactured from steel. FIG. 10 shows the device in this application of securing wire bundles together.

Eight Embodiment

Force is generated through the contraction and expansion of this alloy (presented as a plurality of wires) within the working core, via a piston and transmission mechanism. The most important aspect of this system is the ability to secure the wire elements at both ends such that a reliable assembly is created, enabling high-force, low displacement work to be performed for a maximum number of working cycles.

The embodiment provides a solution to an issue involved in securing Shape Memory Alloy (SMA) wire in a way which does not require the individual positioning of the wires during bundle assembly. Current methods employed involved the use of "salt shaker" embodiments, which consists of a metal plate with an individual hole drilled for each wire contained in a bundle. This method entails lengthy manual assembly times which cause large lead times and costs during assembly. This embodiment provides a method of securing bundles of wires whereby the order in which the wires are installed can be random, thereby allowing more autonomous and faster assembly of the SMA wire bundles.

This embodiment also provides a method of bundle securement which may eliminate the need for swaged or domed wires, whereby the friction forces applied on the wire are enough to secure it. This is advantageous as it removes a step of SMA wire processing thereby reducing manufacturing costs.

Figure 11:
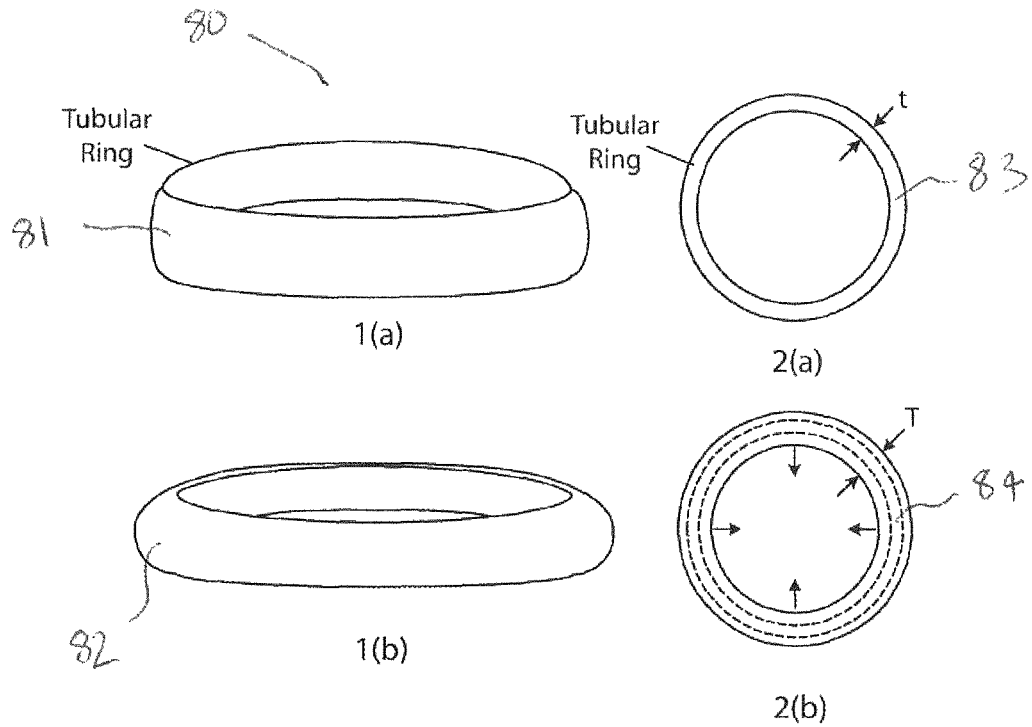
FIGS. 11, 12, 13 & 14 illustrate use of pressurised air or fluid and an elastic tubular ring in order to secure wire bundles together according to one embodiment.

This embodiment involves the use of pressurised air or fluid and an elastic tubular ring 80 in order to secure wire bundles together 10. When deflated, this ring will have a greater inner diameter than the ring when it is fully inflated. This property can secure the wires by placing the wires tightly within the ring pre-inflation. At this point, inflation of the ring will cause a radial pressure to be applied to the wires contained within its centre, resulting in them being secured in place by friction. FIG. 11 illustrates the operation of this embodiment.

Figure 12:
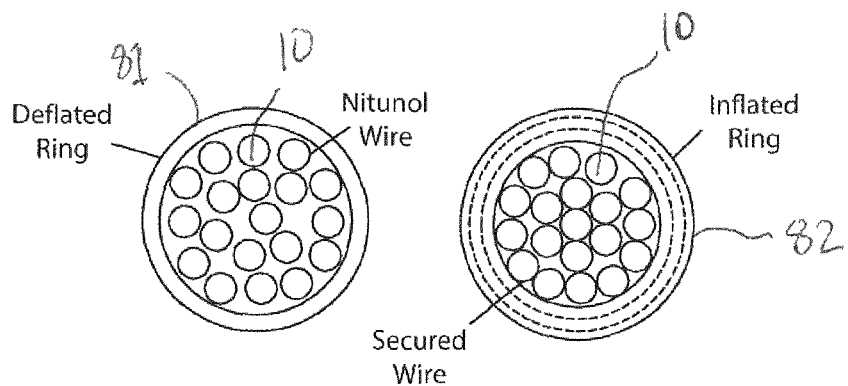

As can be seen in FIG. 11 above, 81 shows the ring in its deflated state and 82 shows the ring in its inflated state. The ring is shown to be taller and thinner initially. However, with the introduction of pressure, the ring decreases in height as well as increasing its width and tubular thickness. This is primarily illustrated in plan view 83 and 84 above, where t is this thickness before inflation and T is thickness after. It can be stated that T>t in this example, and the ring would be suitable to be used to secure a Nitinol bundle in its inner diameter. This is illustrated in FIG. 12 showing a plan view of the wires secured by the substantially tubular ring 81, 82.

Figure 13:
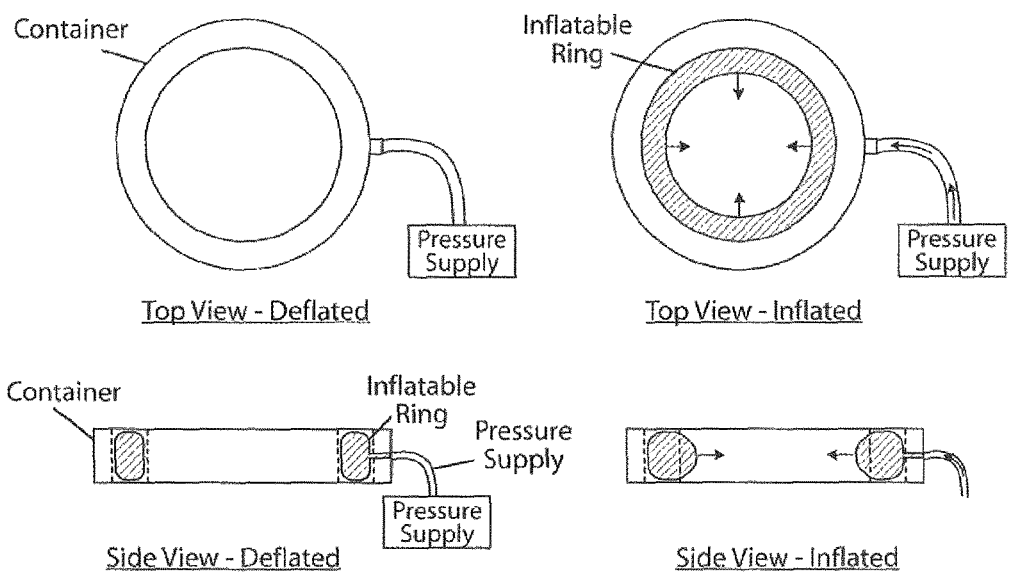
Figure 14:
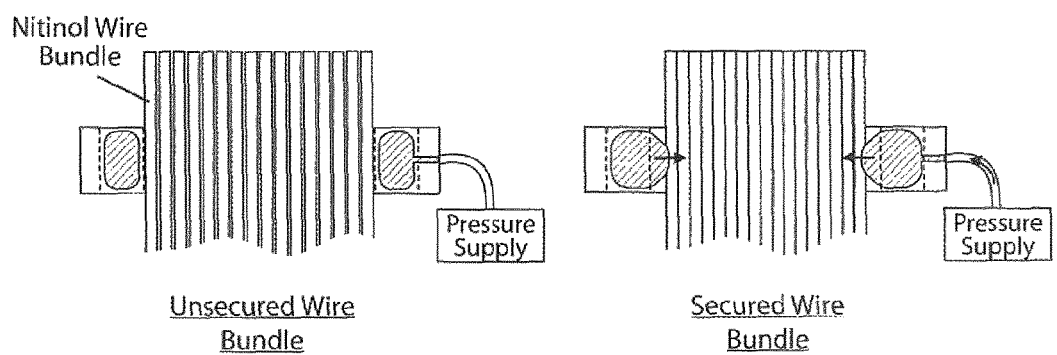

The material with which the ring is manufactured should be resilient enough to withstand the force required to secure the wire, while being elastic enough to provide the desired displacement needed to increase its inner diameter. One material could be nylon, which can provide these attributes, similar to attributes in the application of angioplasty (heart) balloons used in key-hole surgeries. It can also be advantageous to construct a container for this ring, which would restrict its outer diameter expansion, further providing more force/displacement to its inner expansion. The container can also be useful when loading the wire bundles pre inflation as it provides a solid guide as opposed to the relatively flexible inflatable ring. This is shown in FIGS. 13 and 14, where the embodiment is shown with and without the wire bundle respectively.

Ninth Embodiment

Force is generated through the contraction and expansion of this alloy (presented as a plurality of wires) within the working core, via a piston and transmission mechanism. The most important aspect of this system is the ability to secure the wire elements at both ends such that a reliable assembly is created, enabling high-force, low displacement work to be performed for a maximum number of working cycles.

This embodiment provides a method of bundle securement which can obviate the need for swaged or domed wires, whereby the friction forces applied on the wire is enough to secure it. This is advantageous as it removes a step of SMA wire processing thereby reducing manufacturing costs, in addition to being constructed of non-complicated parts.

Figure 15:
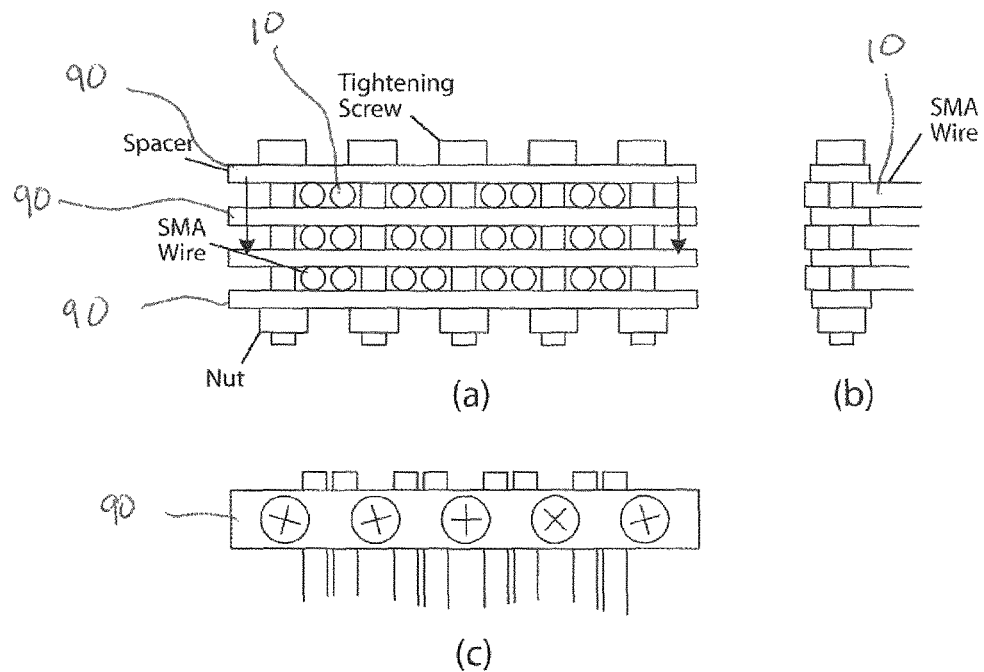
FIGS. 15 & 16 illustrate a method of bundle securement which may eliminate the need for swaged or domed wires according to one embodiment.
Figure 16:
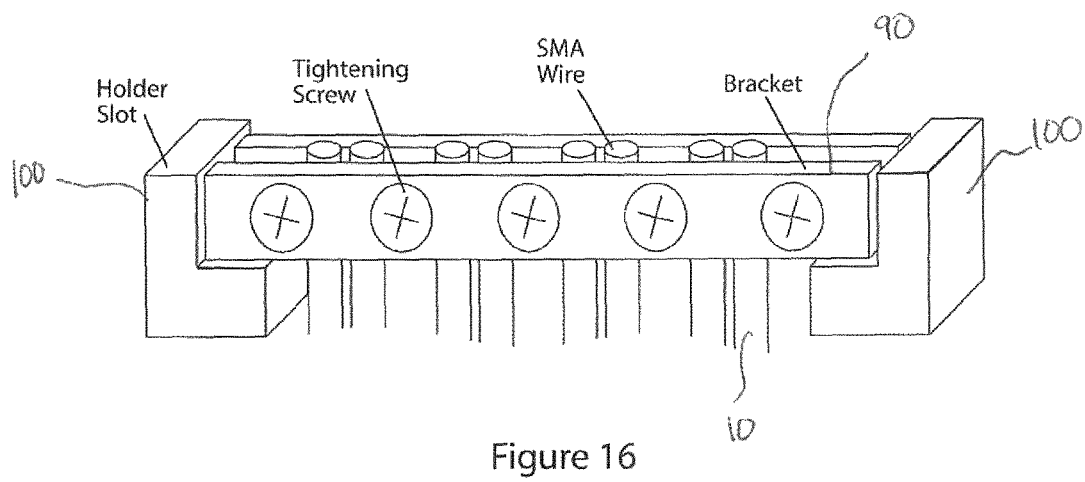

A method of securing a bundle of wires can be realised through the use of straight brackets 90, screws, and nuts. The brackets would be used to provide a force on the wires 10 through the tightening of the screw. These brackets can also have a secondary function as spacers. FIG. 15 illustrates a number of views of such an embodiment where top (a) and side (b) & (c) views are shown. The brackets act as clamps, increasing the force exerted onto the Nitinol wires as the screw is turned and tightened. The embodiment is advantageous as it allows a large number of wires to be secured at once and does not require complicated parts. The surface of the bracket which comes in contact with the SMA wire may also be roughened in order to increase the frictional force applied and hence further secure the wires. After securing the wires using this method, the bundle may be held in place within a core using a holder slot 100, as shown in FIG. 16.

Tenth Embodiment

Force is generated through the contraction and expansion of this alloy (presented as a plurality of wires) within the working core, via a piston and transmission mechanism. The most important aspect of this system is the ability to secure the wire elements at both ends such that a reliable assembly is created, enabling high-force, low displacement work to be performed for a maximum number of working cycles.

In order to secure the plurality of wires in a reliable and durable fashion a system/device capable of anchoring them at both ends has to be developed. This system has to operate under high load. This assembly can be designated as a "bundle holder".

The bundle holder must overcome some specific problems:

1) Transmit the high-force, low displacement load of the wires during operation.

2) Enable the close-packing of the wires, insofar as possible, to enable maximum heat transfer from the transiting water to the wire and vice versa.

3) From a manufacturing point of view, it has to eliminate the tedious and strenuous process of placing hundreds of wires in some sort of support and reduce production time and costs.

The following is a method to grip groups of wires in a bundle under loading conditions without the need to manufacture complex parts that can also be used on wires that have been domed or swaged on both ends.

Figure 17:
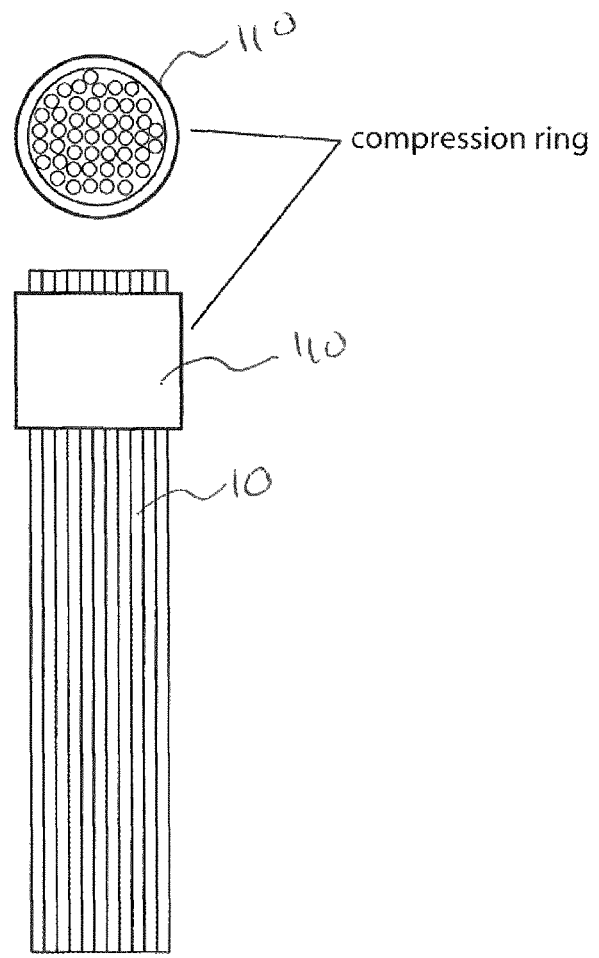
FIGS. 17 & 18 illustrate a ring around a group of wires and then using a press to compress the ring around the wires to form a tight and compact bundle.
Figure 18:
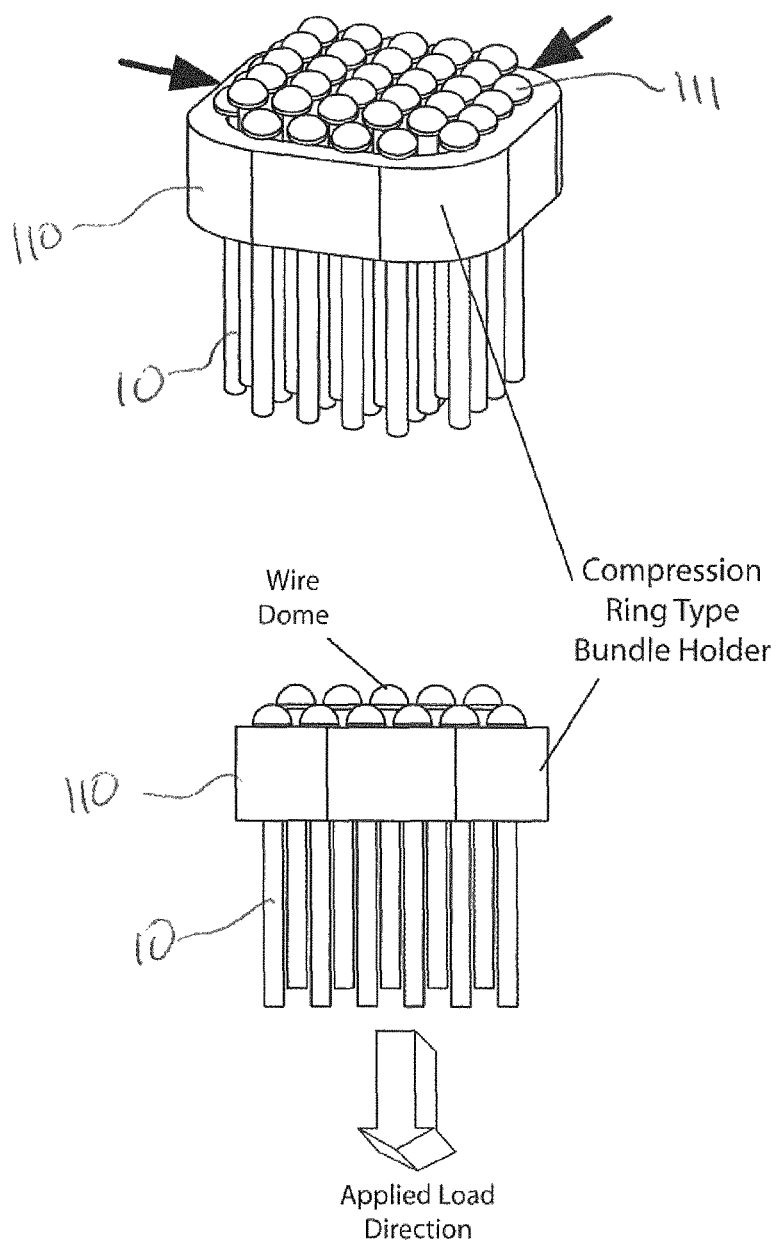

A metal ring 110 can be placed around a group of wires and a press then used to compress the ring around the wires which would then form a tight and compact bundle. This arrangement does not allow one wire to pass by another because of the domes 111 or swages 111 being slightly wider than the rest of the wire, as shown in FIGS. 17 and 18.

The compression ring acts to retain the wires in position, and maintains a gap between the wires that is smaller than the diameter of the swage or dome at any stage. This prevents pull through. The compound effect under loading is the radial transmission of the applied load onto the compression ring which can be is designed to sit on a frame.

Furthermore, to hold wires in position prior to compression of the ring, a polymer, rubber or ceramic based liquid capable of setting to a solid form can be initially applied to the wires. When set, the wires are held in place. The compression ring is then applied to the outside of the newly set solid and compressed, as shown in FIG. 18. The polymer/rubber/ceramic material is non-load bearing, and the load is again transferred radially onto the compression ring.

Eleventh Embodiment

In order to secure the plurality of wires in a reliable and durable fashion a system/device capable of anchoring them at both ends has to be developed. This system has to operate under high load. This assembly has been designated as the "bundle holder"

The bundle holder must overcome some specific problems:
1) Transmit the high-force, low displacement load of the wires during operation.
2) Enable the close-packing of the wires, insofar as possible, to enable maximum heat transfer from the transiting water to the wire and vice versa.
3) From a manufacturing point of view, it has to eliminate the tedious and strenuous process of placing hundreds of these wires in some sort of support and reduce production time and costs.

For this bundle holder embodiment the wires can be mounted on support parts that have a number of grooves 120. The grooves have a double role:
1. To increase the surface on which the wire is in contact with the support, so that the friction won't allow the wires to move.
2. A role of guiding the wires so they will not be on top of each other (even tensioning when wires are gripped and splitting of the paths of the wires)

Figure 19:
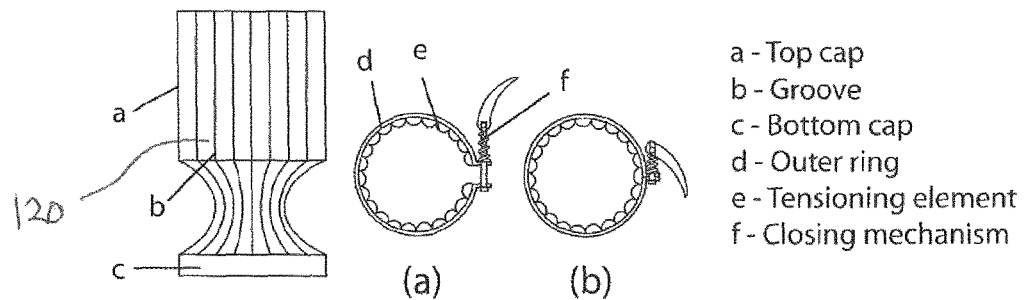
FIG. 19 is a schematic of the grooved support for the SMA and of the clamps a) in the open position and b) in the closed position.

FIG. 19 is a schematic of the grooved support 120 for the SMA wires and of the clamps (a) in the open position and (b) in the closed position. The clamps can have additional elastic tensioners on the inside to ensure that the wires will not get loose with time.

The bottom part of the support is wide so it can split the wires and improve the heat transfer. The support can be mounted in a plate used as a bundle holder.

This embodiment solves the problem of swaging wires individually and it would use a tightening element with elastic tensioning elements to fix them into place.

Twelfth Embodiment

This bundle holder design is solving many of the inherited problems of fixing together the wires, while keeping its structural integrity intact.

The bundle holder consists of a plurality of threaded wires fixed together and placed tightly into a tapered hole and split collet arrangement. The treads act to maintain a good contact in between the wires and not allow them to slip from the bundle while cycling.

Figure 20:
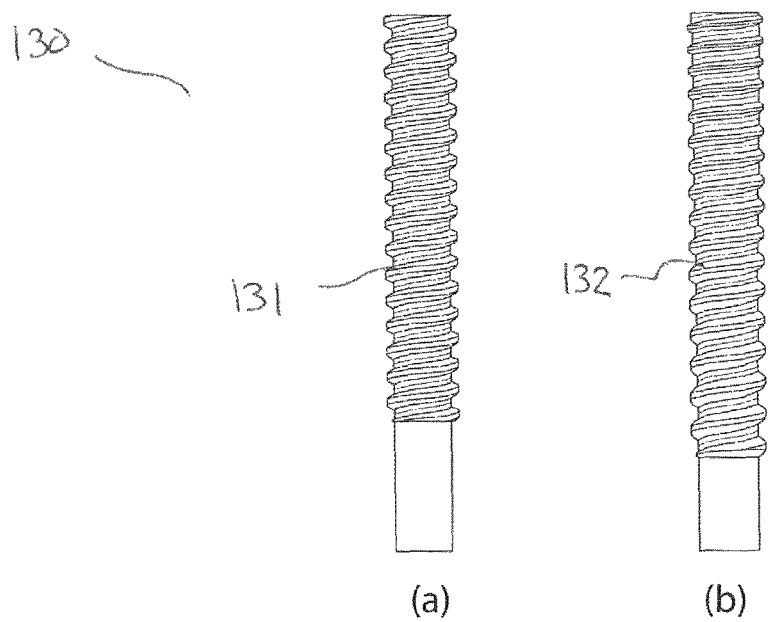
FIG. 20 illustrates types of threads for the SMA wire: a) straight helical thread; b) tapered helical thread.
Figure 21:
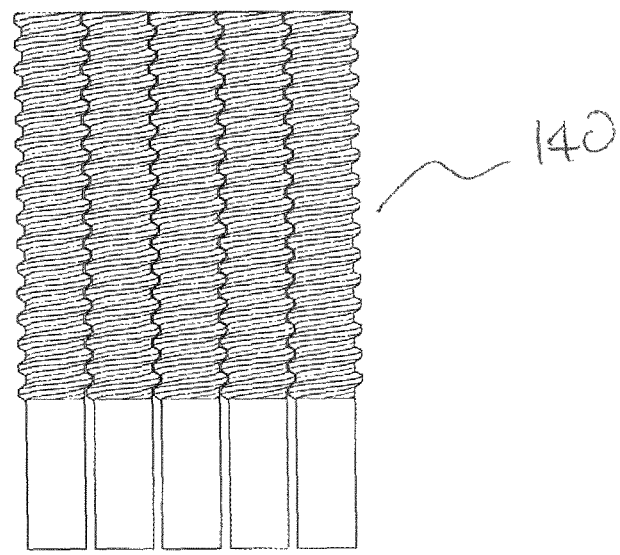
FIG. 21 illustrates a plurality of SMA wires in a bundle when a force is applied to the wires in the bundle, and the split collet and taper compact the threads together.
Figure 22:
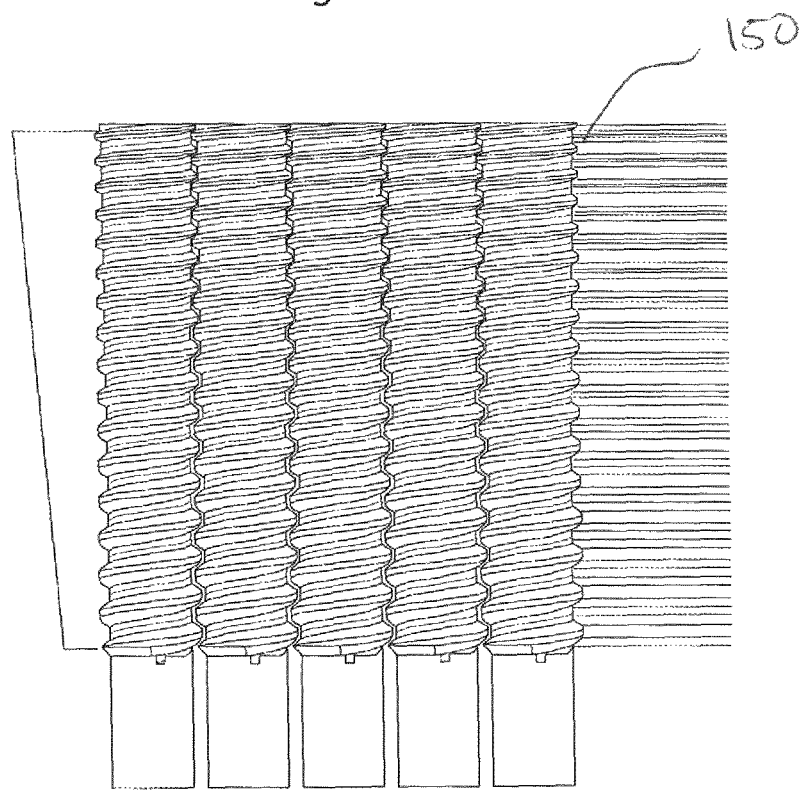
FIG. 22 illustrates a plurality of SMA wires in a tapered collet arrangement.

FIG. 20 presents types of threads 130 for the SMA wire 10: a) straight helical thread 131; b) tapered helical thread 132. FIG. 21 illustrates a plurality of threaded SMA wires 140 in a bundle. When a force is applied to the wires in the bundle, the split collet and taper compact the threads together. FIG. 22 illustrates the SMA wires in a tapered collet, illustrated by the reference numeral 150.

The diameter of the thread is selected so that the thinnest part of the structure would be the engaged part of the wire (the section immersed in cold/hot fluid) that is immediately below the thread.

The length of wire interacting with the fluid flow is drawn or rolled to a smaller diameter, hence a gap between the wires is introduced to facilitate fluid flow.

The reduced diameter can be optimised to allow for the optimum heat transfer between the fluid and SMA wires.

Figure 23:
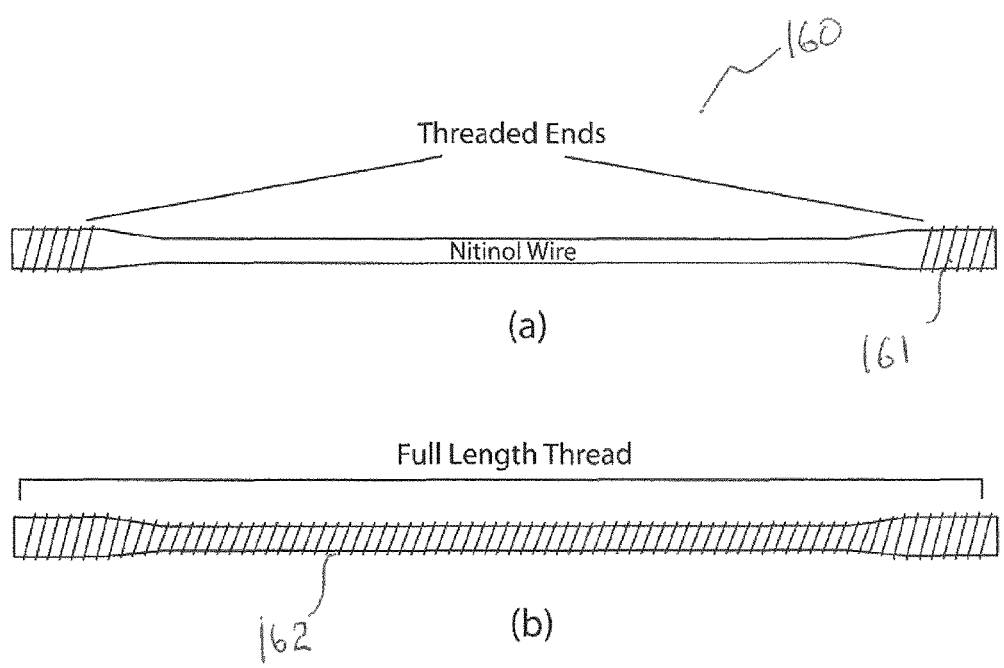
FIGS. 23a & 23b illustrate a number of threaded wire designs according to another embodiment.

FIGS. 23a & 23b illustrates a number of threaded wire designs according to another embodiment 160. The ends of the wire 161 are threaded and butted in order for them to be implemented in a compression bundle fitting, as illustrated in FIG. 23a. In one embodiment a thread is formed along the full length 162 of the wire, as shown in FIG. 23b. The thread increases the surface area of the wire, as well as increase turbulence along this surface during cyclic heating and cooling via a working fluid. This increased surface area and turbulence will serve to increase the thermodynamic performance of the wires.

It is desirable to minimise friction losses due to the added complexity of the flow path. A method of reducing this effect can be to optimise wire layout within the wire bundle whereby the outer wires of the bundle would be smooth (where the working fluid can transfer heat easily), and the inner wires would have the threaded lengths as they would be hardest to reach during heat transfer to the entire bundle. A step further to this is to have a gradual increase in the sizing of the threads, where the outer wires begin smooth but gradually have deeper threads as the wires progress to the centre.

Figure 24:
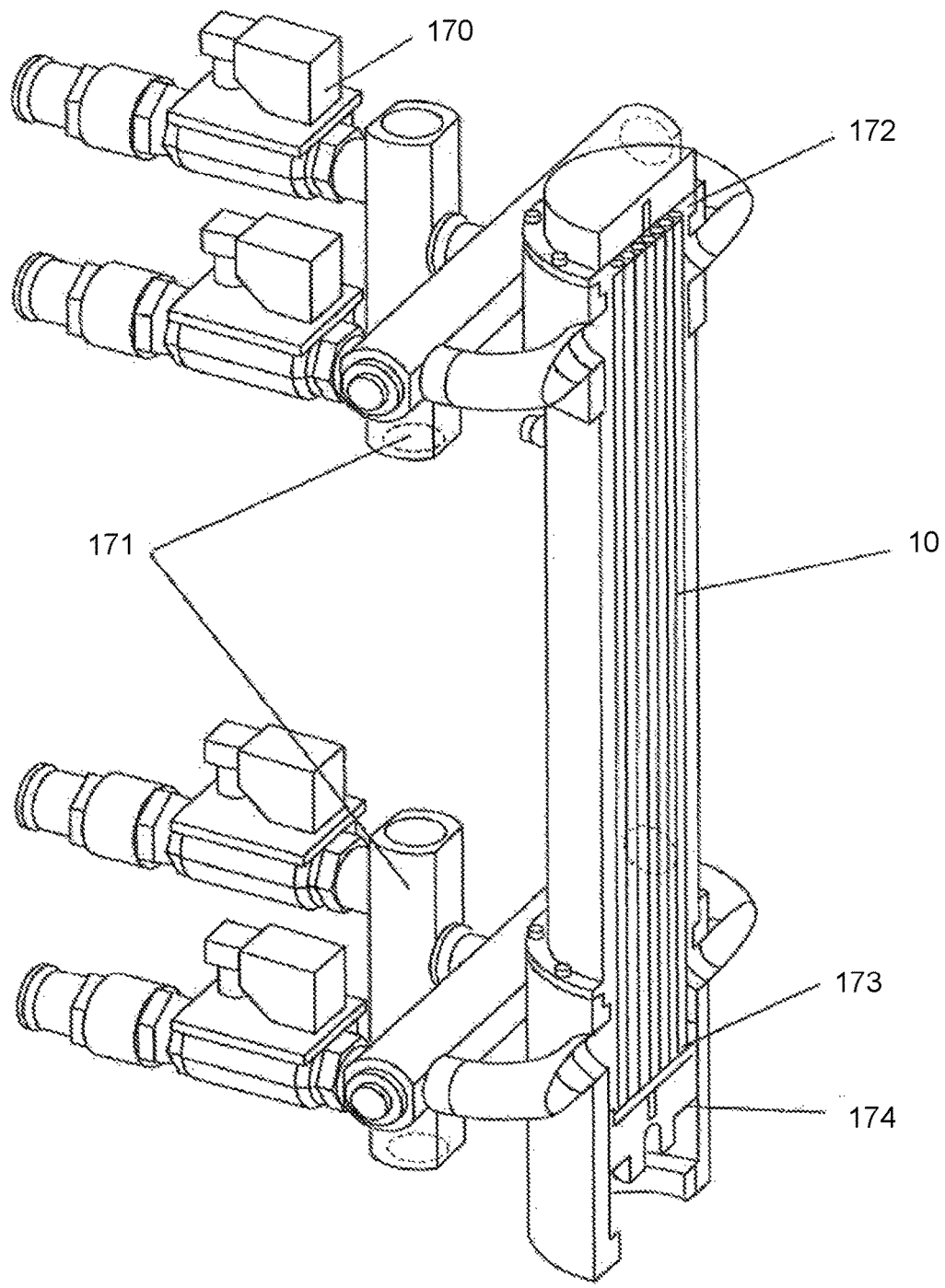
FIG. 24 illustrates an embodiment of a core with a plurality of SMA wires arranged in parallel in use in an energy recovery device.

FIG. 24 illustrates an embodiment of a core with a plurality of SMA wires 10 arranged in parallel in use in an energy recovery device. The core is housed in a chamber and is connected to a fluid source via valves 170 and manifolds 171, 172. The SMA wires 10 are secured at both ends by a bottom and top bundle holder 172 and 173. One end of the core is in communication with a piston 174 that is moveable in response to expansion and contraction of the SMA wires to generate energy.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An energy recovery device comprising:
a drive mechanism;
an engine comprising a plurality of Shape Memory Alloy (SMA) elements or Negative Thermal Expansion (NTE) elements fixed at a first end and connected at a second end to the drive mechanism wherein the engine defines a core with a plurality of NTE or SMA elements arranged in parallel wherein a bracket is adapted to clamp the SMA or NTE elements together at one end such that the SMA or NTE elements are arranged in a bundle friction fit configuration to ensure the SMA or NTE elements are tightly packed together.

2. The energy recovery device of claim 1 wherein at least one SMA or NTE element is swaged at one end to create a mechanical barrier to prevent slippage of the element in use.

3. The energy recovery device of claim 2 comprising a friction fit device.

4. The energy recovery device of claim 2 comprising a friction fit device wherein the device comprises a chain adapted to be tensioned around the SMA or NTE elements using a shackle.

5. The energy recovery device of claim 2 comprising a friction fit device wherein the device comprises a spring clip to ensure the SMA or NTE elements are tightly packed together.

6. The energy recovery device of claim 2 comprising a friction fit device wherein the device comprises a clamp adapted to secure the SMA or NTE elements in a friction fit configuration wherein the clamp is biased by at least one spring to force the clamp around the SMA or NTE elements.

7. The energy recovery device of claim 1 comprising a friction fit device.

8. The energy recovery device of claim 7 wherein the device comprises a chuck adapted to secure the SMA or NTE elements in a friction fit configuration.

9. The energy recovery device of claim 8 wherein the chuck comprises a clamp and an adjuster configured to adjust the force applied to the SMA or NTE elements.

10. The energy recovery device of claim 1 comprising a friction fit device wherein the device comprises a chain adapted to be tensioned around the SMA or NTE elements using a shackle.

11. The energy recovery device of claim 1 comprising a friction fit device wherein the device comprises a spring clip to ensure the SMA or NTE elements are tightly packed together.

12. The energy recovery device of claim 11 wherein the spring clip comprises a stiff material wrapped in a circular fashion and fitted back through a slot.

13. The energy recovery device of claim 1 comprising a friction fit device wherein the device comprises a clamp adapted to secure the SMA or NTE elements in a friction fit configuration wherein the clamp is biased by at least one spring to force the clamp around the SMA or NTE elements.

14. The energy recovery device of claim 1 comprising a friction fit device wherein the device comprises a cable gland to secure the SMA or NTE elements in a friction fit configuration.

15. The energy recovery device of claim 1 comprising a friction fit device wherein the device comprises a pressurised elastic tubular ring to secure the SMA or NTE elements in a friction fit configuration.

16. The energy recovery device of claim 15 wherein the elastic tubular ring is inflatable.

17. The energy recovery device of claim 1 comprising a friction fit device wherein the device comprises one of: a compression ring configured to retain the SMA or NTE elements in position, or at least one groove support.

18. The energy recovery device of claim 1 wherein at least one SMA or NTE element comprises a threaded wire.

19. The energy recovery device of claim 18 wherein the threaded wire comprises a straight helical thread or a tapered helical thread.

20. The energy recovery device of claim 1, wherein the engine further comprises an immersion engine, wherein the drive mechanism is located within the immersion chamber, and wherein the SMA or NTE elements are secured at a first fixed point of the immersion engine, with the immersion engine being adapted to be sequentially filled with fluid to allow heating and cooling of the SMA or NTE elements so as to actuate the drive mechanism.

* * * * *